F. J. PAXTON.
VEHICLE GEAR.
APPLICATION FILED JAN. 12, 1909.
927,276.
Patented July 6, 1909.
2 SHEETS—SHEET 2.
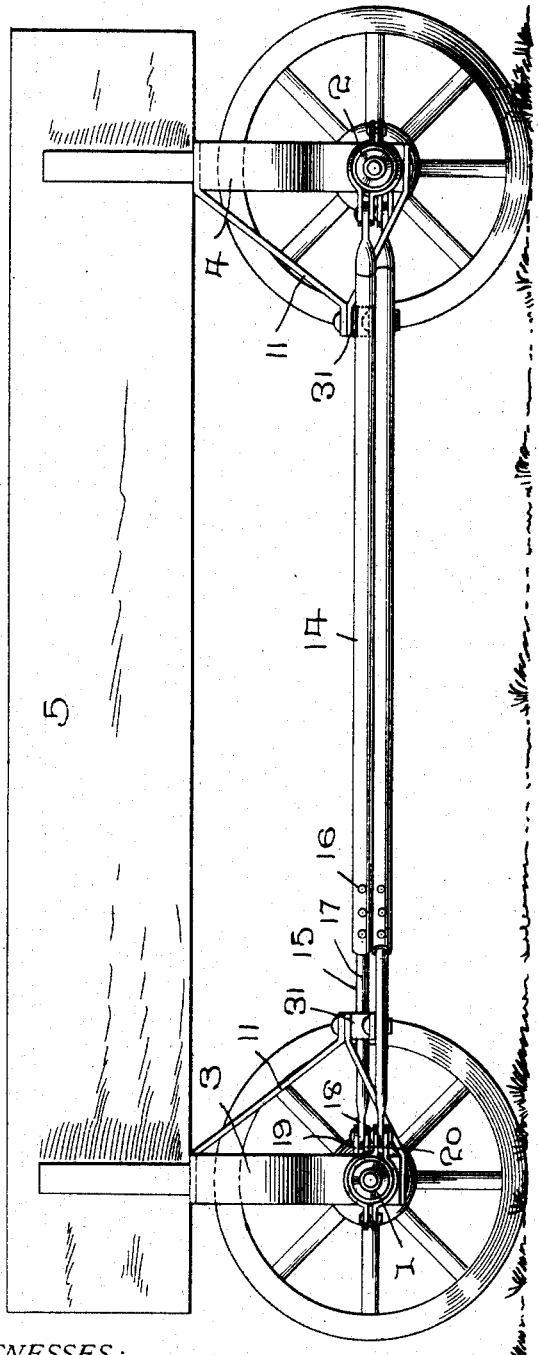
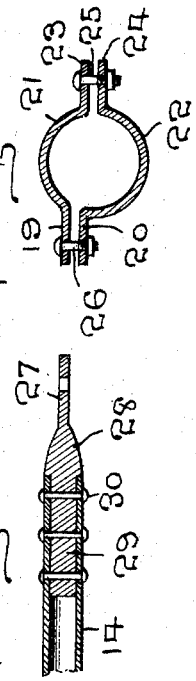
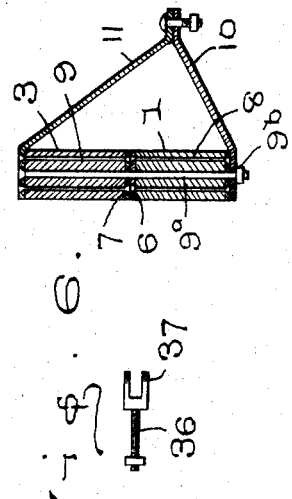
WITNESSES:
INVENTOR
F. J. Paxton
BY
W. J. FitzGerald & Co.
Attorneys

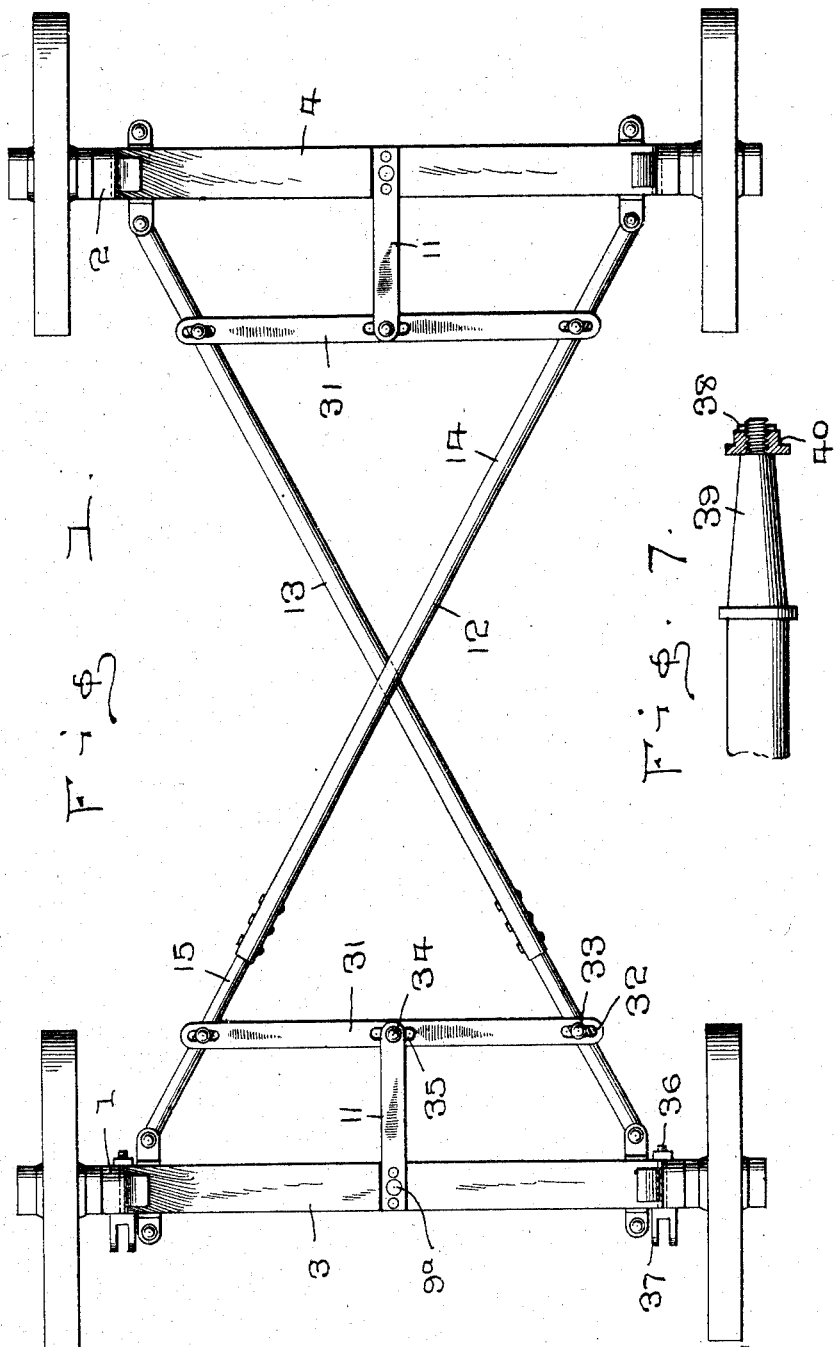

UNITED STATES PATENT OFFICE.

FRANK J. PAXTON, OF REDLANDS, CALIFORNIA.

VEHICLE-GEAR.

No. 927,276.  Specification of Letters Patent.  Patented July 6, 1909.

Application filed January 12, 1909. Serial No. 471,937.

*To all whom it may concern:*

Be it known that I, FRANK J. PAXTON, a citizen of the United States, residing at Redlands, in the county of San Bernardino and State of California, have invented certain new and useful Improvements in Vehicle-Gears; and I do hereby declare the following to be a full, clear, and exact description of the invention, such as will enable others skilled in the art to which it appertains to make and use the same.

My invention relates to new and useful improvements in vehicle gears and my object is to provide means whereby the front and rear axles may be swung on their pivots to guide the vehicle.

A further object is to provide means for adjusting the coupling portion of the running gear.

A further object is to provide means for attaching the coupling portion of the device to the axles of the vehicle.

A still further object is to provide suitable braces for the bolsters of the vehicle and a still further object is to provide means for attaching a pole to the running gear of the vehicle, whereby said vehicle may be drawn in either direction.

Other objects and advantages will be hereinafter referred to and more particularly pointed out in the claims.

In the accompanying drawings forming part of this application, Figure 1 is a top plan view of the running gear of the vehicle ready for use. Fig. 2 is a side elevation thereof, showing a bed in position on the bolsters, the wheels at one side of the vehicle being removed. Fig. 3 is a central transverse sectional view through one of the bolsters and axles, showing the brace member therefor. Fig. 4 is a detail sectional view through one end of one of the reach bars. Fig. 5 is a detail sectional view through one of the collars employed for attaching the reach bars to the axles. Fig. 6 is an elevation of a coupling employed for attaching the pole or tongue to the vehicle, and, Fig. 7 is an elevation of one of the axles showing means for preventing the cap from turning off the threaded portion of the spindle, when the vehicle is moved rearwardly.

Referring to the drawings in which similar reference numerals designate corresponding parts throughout the several views, 1 and 2 indicate the forward and rear axles, respectively, of a running gear, said axles having mounted thereon, bolsters 3 and 4, respectively, on which is adapted to rest any suitable form of bed 5.

The faces of the axles 1 and 2 and the bolsters 3 and 4, respectively, are provided with wearing plates 6 and 7, respectively, which plates are held in position on their respective parts in any preferred manner, as by introducing bolts 8 and 9, respectively, through the axles and the bolsters thereon, the inner ends of said bolts engaging the wearing plates 6 and 7 and holding the same in position. The axles 1 and 2 are pivotally secured to the bolsters 3 and 4 by means of king bolts $9^a$, the lower and upper ends of said bolts being introduced through the ends of brace bars 10 and 11, respectively, the upper end of the bolt $9^a$ being provided with a head, while the lower end thereof is threaded to receive a nut $9^b$ by which means the brace bar 10 is held in position on the king bolt.

The front and rear axles are connected together by means of suitable reach bars 12 and 13, each of said reach bars comprising a tubular section 14 and a rod 15, the rod 15 being of such size as to enter the tubular section and in order to adjust said rod with respect to the tubular section to increase or decrease the length of the reach bar, bolts 16 are extended through the tubular section 14 and through the interposed portion of the rod 15, said rod 15 being provided with a plurality of holes 17 for the reception of the bolts.

The outer ends of the rods 15 are secured to the axle 1 by preferably flattening the rods to form tongues 18, which tongues extend between paralleling ears 19 and 20 of straps 21 and 22, respectively, said straps extending around the axle 1 and when properly secured together, form collars, as shown in Fig. 5. The opposite ends of the straps are likewise provided with ears 23 and 24, through which extends a bolt 25, a similar bolt 26 extending through the ears 19 and 20 and through the interposed portion of the tongue 18 and by drawing said ears toward each other, the collars will be securely clamped on the axle.

Each of the rods 15 is provided with the collars and a similar set of collars are attached to the axle 2, to which the ends of the tubular sections are attached, the ears 27 being attached to heads 28, said heads terminating in shanks 29, which enter the ends of the tubular sections 14 and are secured therein by means of rivets or the like 30.

The brace bars 10 and 11, extend inwardly from the bolsters 3 and 4 and have their meeting ends attached to cross arms 31, said cross arms being secured to the tubular sections 14 and rods 15, respectively, the ends of the cross arms engaging the tubular sections and rods having slots 32 therethrough through which extend pins 33, said pins being employed for securing the cross arms in position, while the brace bars are secured to said cross arms by means of bolts 34, said bolts likewise extending through slots 35 in the central portions of the cross arms, the object of said slots being to permit the cross arms to properly adjust themselves when the reach bars are shifted to change the course of the vehicle.

A draft pole or shafts are secured to parts of the vehicle by extending bolts 36 through the axles 1 and 2, the outer ends of said bolts having alining ears 37 thereon, between which the ends of the poles or shafts are to be introduced and by providing a set of bolts for each axle, the vehicle may be moved in either direction.

Should the vehicle be moved rearwardly, it becomes necessary to provide means for preventing the taps employed for holding the wheels on the spindles, from turning off the spindles and to this end, a key 38 is extended through the projecting end of the spindle 39 and on the outside of the tap 40, employed for holding the wheel in position, although it will be understood that any other suitable form of device for holding the tap in position on the spindle may be employed.

By providing the reach bars and attaching them to the axle as shown, it will be readily seen that both axles will be simultaneously shifted to change the course of the vehicle thereby permitting the course of the vehicle to be more quickly changed and permitting the vehicle to be turned in a smaller space. It will likewise be seen that by providing adjustable reach bars, the running gear of the vehicle may be lengthened or shortened for objects of greater or less length and by attaching the braces 10 and 11 in the manner shown, the bolsters will be rigidly held in an upright position.

What I claim is:

1. In a vehicle construction, the combination with a pair of axles and bolsters pivotally connected to said axles of a pair of inflexible reach bars crossing each other about centrally and pivotally connected to said axles, transverse bars connected to said reach bars near their forward and rearward ends respectively, said transverse bars having slotted pivotal connection with said reach bars and angular brace bars, the lower one of said brace bars being connected to an axle and the upper one of said brace bars being connected to a bolster, the convergent ends of said brace bars being pivotally and slidably connected to said transverse bars.

2. In a vehicle construction, the combination with a pair of axles and bolsters pivotally connected to said axles, of a pair of crossed reach bars having pivotal connection at their ends with said axles, transverse bars between said reach bars having pin and slot connections with the latter, and angular brace bars, the upper one of said bars being connected to an axle at one end and the other one being connected to a bolster at one end, the convergent ends of said brace bars having bolt and slot connection with a transverse bar.

In testimony whereof I have signed my name to this specification in the presence of two subscribing witnesses.

FRANK J. PAXTON.

Witnesses:
 CHAS. E. TRUESDELL,
 M. BANDHOLTZ.